(12) United States Patent
Farley et al.

(10) Patent No.: US 11,599,844 B2
(45) Date of Patent: Mar. 7, 2023

(54) PARCEL SHIPPING SCREENING AND VALIDATION

(71) Applicant: International Bridge, Inc., Orem, UT (US)

(72) Inventors: John Farley, Orem, UT (US); Oleksandr Akhtyrskiy, Orem, UT (US); John Warr, Springville, UT (US)

(73) Assignee: INTERNATIONAL BRIDGE, INC., Orem, UT (US)

( * ) Notice: Subject to any disclaimer, the term of this patent is extended or adjusted under 35 U.S.C. 154(b) by 215 days.

(21) Appl. No.: 16/930,963

(22) Filed: Jul. 16, 2020

(65) Prior Publication Data

US 2020/0349500 A1    Nov. 5, 2020

Related U.S. Application Data

(62) Division of application No. 14/579,768, filed on Dec. 22, 2014, now Pat. No. 10,726,380.

(51) Int. Cl.
G06Q 10/08 (2012.01)
G06Q 10/0831 (2023.01)

(52) U.S. Cl.
CPC ................. *G06Q 10/0831* (2013.01)

(58) Field of Classification Search
CPC .................................................. G06Q 10/0831
See application file for complete search history.

(56) References Cited

U.S. PATENT DOCUMENTS

| 5,768,384 | A | 6/1998 | Berson |
| 7,312,702 | B1 * | 12/2007 | Willms ................. G06Q 50/26 705/333 |
| 7,735,731 | B2 | 6/2010 | Skaaksrud et al. |
| 7,753,271 | B2 | 7/2010 | Skaaksrud et al. |

(Continued)

FOREIGN PATENT DOCUMENTS

| WO | WO-2016/057000 | 4/2016 |
| WO | WO-2016/105676 | 6/2016 |

OTHER PUBLICATIONS

Patrick A. Messerlin, Trade Facilitation: Technical Regulations and Customs Procedures, 2000, p. 4-5 (Year: 2000).*

(Continued)

*Primary Examiner* — Resha Desai
*Assistant Examiner* — Ibrahim N El-Bathy
(74) *Attorney, Agent, or Firm* — Parsons Behle & Latimer

(57) ABSTRACT

A method and apparatus provides a customs review system for building a customs approval database and system suitable for reviewing and verifying values and/or commodities of product parcels passing through customs. The customs review system can receive and store a stock keeping unit (SKU) for a product parcel in the customs approval database. The customs review system can also receive a Uniform Resource Locator (URL) related to the SKU and automatically associate the SKU with the URL in the customs approval database. In response to associating the SKU and the URL, the customs review system can make the product parcel as pre-approved or rejected for shipment to customs. The customs review system can search the customs approval database for the SKU of the product parcel and validate or invalid the product parcel being submitted for shipment and importation based on the search.

17 Claims, 10 Drawing Sheets

(56) References Cited

U.S. PATENT DOCUMENTS

| | | | |
|---|---|---|---|
| 7,766,230 | B2 | 8/2010 | Skaaksrud et al. |
| 7,775,431 | B2 | 8/2010 | Skaaksrud et al. |
| 7,798,400 | B2 | 9/2010 | Skaaksrud et al. |
| 7,810,724 | B2 | 10/2010 | Skaaksrud et al. |
| 7,837,105 | B2 | 11/2010 | Skaaksrud et al. |
| 7,844,553 | B2 | 11/2010 | Whitehouse |
| 7,870,999 | B2 | 1/2011 | Skaaksrud et al. |
| 7,883,013 | B2 | 2/2011 | Skaaksrud et al. |
| 7,886,972 | B2 | 2/2011 | Skaaksrud et al. |
| 10,108,921 | B2 | 10/2018 | Sultan |
| 10,417,602 | B2 | 9/2019 | Farley et al. |
| 10,726,380 | B2 | 7/2020 | Farley et al. |
| 2003/0069738 | A1 | 4/2003 | Casey et al. |
| 2003/0195815 | A1 | 10/2003 | Li et al. |
| 2004/0098272 | A1 | 5/2004 | Kapsis et al. |
| 2004/0143600 | A1 | 7/2004 | Musgrove et al. |
| 2004/0243484 | A1* | 12/2004 | Smith .............. G06Q 10/10 705/26.1 |
| 2005/0004894 | A1 | 1/2005 | Uy et al. |
| 2005/0010431 | A1 | 1/2005 | Uy et al. |
| 2005/0015390 | A1 | 1/2005 | Uy et al. |
| 2005/0114219 | A1 | 5/2005 | Sultan |
| 2006/0011716 | A1* | 1/2006 | Perkowski ........ G06Q 30/02 235/375 |
| 2006/0036504 | A1 | 2/2006 | Allocca et al. |
| 2007/0073592 | A1* | 3/2007 | Perry .............. G06Q 30/0601 705/26.1 |
| 2008/0004995 | A1* | 1/2008 | Klingenberg ...... G06Q 10/083 705/28 |
| 2008/0091577 | A1 | 4/2008 | Holmes et al. |
| 2008/0230607 | A1* | 9/2008 | Etten .............. G06K 17/0022 235/462.27 |
| 2008/0255863 | A1 | 10/2008 | Mack et al. |
| 2009/0019008 | A1* | 1/2009 | Moore .............. G06Q 30/02 |
| 2009/0034790 | A1 | 2/2009 | Song et al. |
| 2009/0043674 | A1* | 2/2009 | Minsky ........... G06Q 30/0603 715/765 |
| 2010/0088208 | A1 | 4/2010 | Saxena et al. |
| 2011/0066549 | A1 | 3/2011 | Whitehouse |
| 2011/0078029 | A1 | 3/2011 | Bickle |
| 2011/0161249 | A1 | 6/2011 | Whitehouse |
| 2011/0274275 | A1 | 11/2011 | Seitz |
| 2011/0307405 | A1 | 12/2011 | Hammer et al. |
| 2012/0005105 | A1 | 1/2012 | Beier et al. |
| 2012/0290440 | A1 | 11/2012 | Hoffman et al. |
| 2013/0031350 | A1* | 1/2013 | Thielen ........... H04L 63/08 713/100 |
| 2013/0117353 | A1 | 5/2013 | Wong et al. |
| 2013/0277425 | A1 | 10/2013 | Sharma et al. |
| 2015/0066695 | A1 | 3/2015 | Delingat et al. |
| 2015/0154539 | A1* | 6/2015 | Skaaksrud ........ H04W 64/003 705/333 |
| 2016/0180286 | A1 | 6/2016 | Farley et al. |
| 2017/0132489 | A1 | 5/2017 | Simgi |
| 2018/0300668 | A1 | 10/2018 | Farley et al. |

OTHER PUBLICATIONS

Australian Intellectual Property Office; Examination Report dated Mar. 3, 2021; AU Patent Application No. 2015370361.

Ding, et al., "Auto-Categorization of HS Code Using Background Net Approach," *ScienceDirect*, 60:1462-1471, (2015).

Excerpt from "Animation: Descartes CustomsInfoTM Manager." Originally published Feb. 2017. Retrieved from https://www.youtube.com/watch?v=jG9jez5qGmU, Feb. 2019 (1 page).

"FindmyHS." Flatworld Labs. Retrived from http://www.flatworldlabs.com/FindmyHS.php, Feb. 2019 (2 pages).

"HS Classification Assistance Tool." 3CE Technologies. Retrieved from http://www.3cd.com/solutions/customs-and-regulatory-compliance/hs-classification-assistance-tool/, Feb. 2019 (4 pages).

Messerlin, et al., "Trade Facilitation: Technical Regulations and Customs Procedures," pp. 4-5, (2000).

International Search Report for International Application No. PCT/US2015/059694, dated Feb. 2, 2016.

Final Office Action from U.S. Appl. No. 14/579,768, dated Jan. 2, 2019.

Final Office Action from U.S. Appl. No. 14/579,768, dated Oct. 31, 2017.

Non-Final Office Action from U.S. Appl. No. 14/579,768, dated Dec. 9, 2019.

Non-Final Office Action from U.S. Appl. No. 14/579,768, dated Apr. 19, 2018.

Non-Final Office Action from U.S. Appl. No. 14/579,768, dated May 2, 2017.

Non-Final Office Action from U.S. Appl. No. 15/490,520, dated Mar. 4, 2019.

Notice of Allowance for U.S. Appl. No. 14/579,768, dated Apr. 6, 2020.

Notice of Allowance for U.S. Appl. No. 15/490,520, dated May 21, 2019.

* cited by examiner

| Name 402 | Sellers 404 | 406 | Company 408 | SKU 410 | Price 412 | Country 414 | Short Name 416 | Status 418 | Assigned User 420 |
|---|---|---|---|---|---|---|---|---|---|
| One Shoulder Dress Color Video Intercom Doorbell | View(1) | | LightInTheBox | 446056 | $229.99 | CHINA | | | Nadilya Kuipersova |
| RFID and Code Access Control System | View(1) | | LightInTheBox | 67277 | $28.99 | CHINA | | | Nadilya Kuipersova |
| Replacement Earphone with Volume Control for iPhone Oriental Earphone | View(1) | | LightInTheBox | 178633 | $9.98 $12.99 | CHINA | | | Nadilya Kuipersova |
| Network Adapter for Wii | View(1) | | LightInTheBox | 156694 | $6.56 | CHINA | | | Nadilya Kuipersova |
| Residual Blued Plum Cotton Fabric | View(1) | | LightInTheBox | 345566 | $14.99 | CHINA | | | Nadilya Kuipersova |
| Polyester Reactive Print Plain Fabric | View(1) | | LightInTheBox | 345578 | $14.99 | CHINA | | | Nadilya Kuipersova |
| Polyester Reactive Print Plain Fabric | View(1) | | LightInTheBox | 345582 | $29.99 | CHINA | | | Nadilya Kuipersova |

| ITEMIZED: | |
|---|---|
| HAWB: | 7531476458 |
| BAG: | HKGCVG1362909 |
| MAWB: | 403-37664056 |
| SHIPPER: | EVERBUYING |
| SELLERS: | VIEW (1) |
| KNOWN ITEM PRICE: | 7.46 |
| DECLARED ITEM VALUE: | 7.46 |
| DECLARED QUANTITY: | 1 |
| DECLARED SUBTOTAL: | 7.46 |
| SKU: | YM6338101, VIEW SOURCE |
| NAME: | SINGLE-BREASTED STITCHING CUFFS COTTON COLOR MATCHING FORMAL BLOUSE FOR WOMEN (WITH RANDOM BOW-TIE) |
| DESCRIPTION: | CONVERTER: cm inchCONVERTER: inch cmSPECIFICATION COLOR: BLUE, BLACK SIZE: S, M, L, XL, 2XL CATEGORY: WOMEN > TOPS > BLOUSES MATERIAL: COTTON CLOTHING LENGTH: REGULAR SLEEVE LENGTH: FULL PATTERN TYPE: PATCHWORK ESTABLISHMENT: BOW STYLE: FORMAL WEIGHT: 0.5KG PACKAGE CONTENTS: 1 X BLOUSE |
| SHORT NAME: | BLOUSE FOR WOMEN |
| IMPORTED: | 0 TIME(S) |

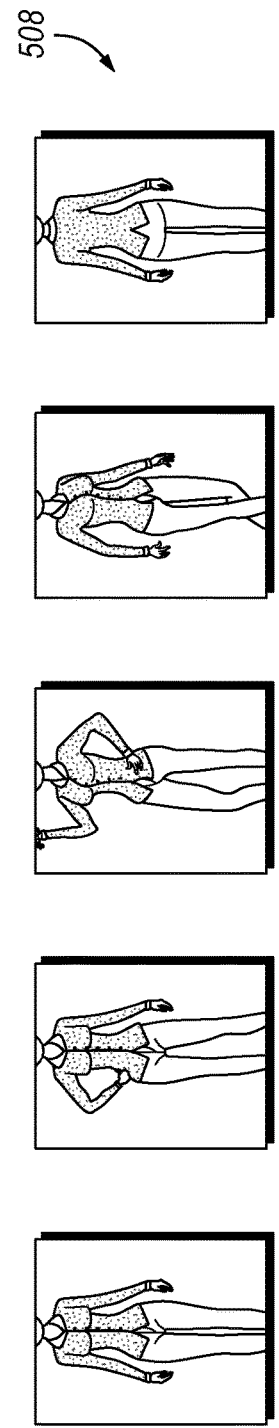

*FIG. 5E*

PARCEL SHIPPING SCREENING AND VALIDATION

RELATED APPLICATIONS

This application is a division of, and claims the benefit of and priority to, co-pending U.S. patent application Ser. No. 14/579,768 filed Dec. 22, 2014, which is expressly and entirely incorporated herein by reference.

FIELD OF THE INVENTION

The present invention relates to building a customs approval database and system suitable for reviewing and verifying values and/or commodities of product parcels passing through customs. In particular, the present invention relates to building and displaying database values and/or commodities for efficiently screening product parcels for shipment and for screening of the product parcels by customs.

BACKGROUND

Generally, international trade involves the exchange of capital, goods, and services across international borders or territories. Large and small companies and individuals commonly rely on parcel shippers to transport their goods across international borders or territories for delivery to their desired destination. Parcel shippers are capable of shipping a wide variety of goods efficiently and at a low cost. One of the challenges of shipping internationally is clearing items through customs. Customs authorities and/or agencies are responsible for collecting customs duties and controlling the transportation of the goods in and out of their respective countries. Each country has its own laws and regulations for controlling the importation and exportation of goods into and out of the country. The importation or exportation of certain goods may be restricted or forbidden (e.g., counterfeit or illegal goods) based on the controlling jurisdiction.

Frequently, shippers of these goods are not sure which items are counterfeit and which items are not, therefore, to reduce the risk of importing something illegal, are confined to using channels that are slow and unreliable (e.g., postal channels), which limits their business potential. When shipping parcel commodities through postal channels, the parcels are commonly presented somewhat vaguely to customs, with many package contents declared as "gifts", "samples" or "electronics", and often the items in a package do not match the description. Similarly, shippers that are unsure of rules or intellectual property laws for a particular jurisdiction may intentionally disguise product descriptions. Such practices complicate custom's job because customs officials are not able to inspect all the packages that are presented vaguely or improperly. The vague and inaccurate representation of parcels results in a significant amount of counterfeit goods that enter the United States market and other markets each year. Accordingly, customs agencies are concerned about the amount of pirated goods that enter the United States and other markets but struggle with limited resources to enforce importation rules Another area of concern for customs is the declared value of items. Shippers commonly under-declare shipment values to lower the potential duties charged. Generally, the under-declaration is unnecessary, as there would be no duties on the package at its full value. Customs organizations tend to assess penalties or hold shipments for such activity when discovered. Accordingly, a way is needed to educate shippers on how to present appropriate information to customs, resulting in gaining the trust of customs.

SUMMARY

There is a need for efficiently classifying and screening items that must pass through customs when shipped to a destination. The present invention is directed toward further solutions to address this need, in addition to having other desirable characteristics. Specifically, in accordance with an example embodiment of the present invention, a method of building a customs approval system includes receiving stock keeping unit (SKU) data. A Uniform Resource Locator (URL) is also received for a webpage from which one or more items associated with the SKU data are advertised or marketed. Using a processor, the SKU data is automatically associated with the URL in a database stored in a storage medium. Upon storage in the database of the association of the SKU data with the URL, the SKU data associated with the one or more items is transformed into a pre-approved SKU item, an invalid SKU item, or a SKU item under investigation.

According to aspects of the present invention the SKU data is provided by a manufacturer or reseller of the one or more items. According to further aspects of the present invention the URL is provided by a manufacturer or reseller of the one or more items. According to other aspects of the present invention the step of associating the SKU data with the URL is carried out by a processor and is based on an automated search for the SKU data, identifying the webpage from which the product parcel is advertised or marketed, and recording the URL of the webpage.

According to an example embodiment of the present invention a method includes a customs approval system receiving stock keeping unit (SKU) data from a product parcel being shipped, the customs approval system searching for the SKU data for the product parcel in a database. When the SKU data for the product parcel is located in the database, the customs approval system provides, for display, data identifying the SKU data and data identifying a Uniform Resource Locator (URL) for a webpage from which the product parcel is advertised or marketed. When the SKU data for the product parcel is not located in the database, is classified as invalid, or is under investigation in the database the customs approval system rejects the product parcel.

According to aspects of the present invention the customs approval system receives the SKU data from a scanning device configured to read SKU data. According to further aspects of the present invention the database stores SKU data in association with the URL for the product parcel being shipped. According to other aspects of the present invention upon receiving the SKU data, the customs approval system automatically initiates the step of searching for the SKU data for the product parcel in the database. According to aspects of the present invention the webpage displays at least one image of the product parcel being shipped. According to further aspects of the present invention the step of providing, for display, data identifying the SKU data and data identifying the URL for the webpage from which the product parcel is advertised or marketed comprises causing the display of a name and image of the product parcel.

According to an example embodiment of the present invention a customs approval system includes a database coupled with a storage device storing one or more stock keeping unit (SKU) data for a product parcel in association with a Uniform Resource Locator (URL) for a webpage from which the product parcel is advertised or marketed and wherein storage of the SKU data in association with the one or more product image data is an indication of pre-approval of the product parcel by the customs approval system.

According to aspects of the present invention the webpage displays at least one image of the product parcel being shipped. According to further aspects of the present invention the system provides, for display, data identifying the SKU data and data identifying the URL for the webpage from which the product parcel is advertised or marketed, to a display device. According to other aspects of the present invention the display device comprises a mobile device. According to further aspects of the present invention a combination scanning and displaying mobile device configured for communication with the database. According to other aspects of the present invention the storage device exists in a cloud computing infrastructure.

BRIEF DESCRIPTION OF THE FIGURES

These and other characteristics of the present invention will be more fully understood by reference to the following detailed description in conjunction with the attached drawings, in which:

FIG. 4 is a graphical representation of the customs review system, in accordance with aspects of the invention;

FIGS. 5A, 5B, 5C, 5D, and 5E are graphical representations of the customs approval system, in accordance with aspects of the invention.

DETAILED DESCRIPTION

Figure 1:
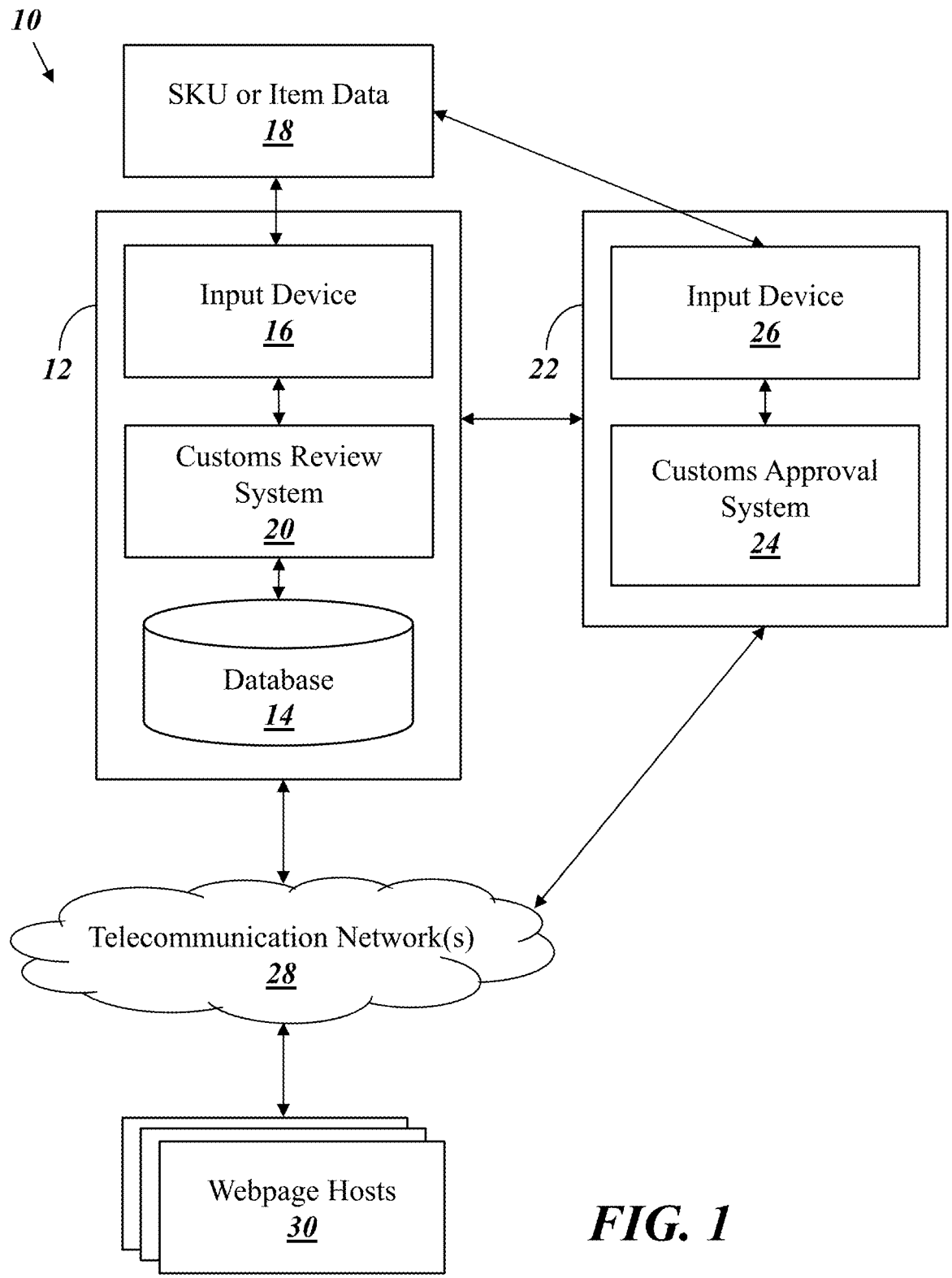
FIG. 1 is an illustrative environment for implementing the steps in accordance with the aspects of the invention.

An illustrative embodiment of the present invention relates to a system and method for building a database to provide product parcel information for screening to shippers and for review by customs, and the corresponding operation of the system by shippers and customs officials to screen product parcels. Specifically, present invention enables shippers to screen product parcels while only allowing pre-approved product parcels to ship and present shipment data of the pre-approved product parcels to customs in a transparent and easily auditable format. To carry out the steps of the present invention, Stock Keeping Unit (SKU) or item data for product parcels of a shipment are collected and organized in a specialized format by a custom review system to allow for product parcels to be reviewed by shippers prior to being shipped and going through customs. Additionally, the custom review system may obtain a link to a webpage from which the product parcels are sold, displayed, and/or marketed. Thereafter, the SKU or item data for a given product parcel and the respective webpage link may be associated with one another in a database and are displayed in the specialized format to a screener. The database may be used to create a customs review system for displaying the SKU or item data to a shipper prior to acceptance of a shipment. The database may also be presented to a customs pre-approval system for displaying the SKU or item data to customs for acceptance.

In many instances, shippers may have hundreds of thousands of distinct SKUs or items for product parcels to be shipped. To efficiently pre-screen the product parcels prior to shipment and for customs, the present invention enables screeners to quickly view the most updated photos and descriptions for each product parcel in an organized review system. For example, SKU or item data and the current webpage link for each of the SKUs or items of a potential shipment are used to create a database with detailed information (e.g., pictures and descriptions) about the SKUs or items for review. A screener may review the detailed information of all the SKUs or items included in product parcels for any potential violations for a particular customs authority or agency to determine legality of importation of that product parcel, prior to acceptance of the product parcels for shipment. For example, all the SKUs or items in a product parcel and their corresponding webpage link(s) are organized in a format in which screeners may review photos for registered brands, designs, or trademarks. Advantageously, in example embodiments, the customs review system may contain a regularly updated extensive list of commonly violated brands. Item names or descriptions that contain one of these violated brand names are automatically highlighted for easy detection/review by a screener. As would be appreciated by one of skill in the art, the customs review system may also use image recognition software to locate and/or identify potential intellectual property violations. A screener may mark SKUs or items as invalid or valid based on the detailed information associated with SKUs or items contained therein. For example, a screener may validate or invalidate SKUs or items based on the review of the information displayed on the SKUs or items respective webpage link(s), which should contain the most up to date information for the product(s).

Once the SKU or items data and webpage links for the product parcels are reviewed, the customs review system automatically accepts or rejects product parcels based on the validity of the SKUs or items in the product parcels. Validated product parcels are accepted for shipment, collected from customers, prepared for shipment, and shipped to the appropriate locations. Prior to the shipment arriving at the appropriate customs agency (e.g., United States Customs), detailed information for the product parcels may be displayed to a customs agency/agent in a user-friendly system that enables the customs agency/agent to view a high-level total-shipment data. For example, the customs approval system enables the customs agency to access database information for each individual product parcel, parcel location, and pictures and descriptions of all SKUs or items included in the product parcel. Specifically, the customs approval system may display SKUs or item descriptions, names, and values of the items and present customs with the webpage link for each item. Based on the displayed shipment data, the customs agency/agent is able to approve or reject the product parcels. Accordingly, customs can use the customs approval system to clear product parcels or place a hold on the product parcels for further inspection. For example, United States Customs agency may place a hold on a product parcel in their Automated Manifest System (AMS) based on the reviewed information.

FIGS. 1 through 6, wherein like parts are designated by like reference numerals throughout, illustrate an example embodiment or embodiments of building a customs approval system and database, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed in a manner still in keeping with the spirit and scope of the present invention.

FIG. 1 depicts a high level architecture of implementing processes in accordance with aspects of the present invention. Specifically, FIG. 1 depicts a computing system 10 including a computing device 12 having a database 14 and an input device 16. The computing device 12 may be a general purpose computer or a specialized computer system. For example, the computing device 12 may include a single computing device, a collection of computing devices in a network computing system, a cloud computing infrastructure, or a combination thereof, as would be appreciated by those of skill in the art. In example embodiments, the computing device may be a combination scanning (e.g., using input device 16) and displaying mobile device configured for communication with the database 14. Similarly, as would be appreciated to one of skill in the art, the database 14 may include any combination of computing devices configured to store and organize a collection of data. For example, the database 14 may be a local storage device on the computing device 12, a remote database facility, or a cloud computing storage environment. The database 14 may also include a database management system utilizing a given database model configured to interact with a user for analyzing the database data.

In accordance with an example embodiment of the present invention, the input device 16 may be used for scanning, receiving, and/or otherwise obtaining SKU or item data 18 for product parcels or a shipment. For example, the input device 16 may be a barcode reader configured to scan, read, and/or analyze the SKU or item data 18 (e.g., a barcode for product parcels) to be provided to the computing device 12 and/or the database 14. As one of skill in the art would appreciate, a bar code reader may be any combination of physically attached barcode readers or wireless handheld barcode readers. The input device 16 (e.g., barcode reader) may be configured to read and analyze various 2 dimensional and 3 dimensional barcode standards (e.g., Universal Product Code (UPC), Quick Reference (QR) code, SKU, etc.). In accordance with an example embodiment, a barcode on a product parcel may indicate a package number that is linked to one or multiple SKU(s) data contained in the product parcel. For example, the input device 16 may scan the barcode on the product parcel that indicates the SKU or item data 18 for one or multiple SKU(s) within the product parcel. As would be appreciated by one of skill in the art, the input device 16 may receive SKU or item data 18 for large bulk shipments including multiple product parcels containing numerous different SKUs. For example, the input device 16 may electronically receive a file from a manufacturer containing the SKU or item data 18 for a shipment containing many larger product parcels including bulk shipments of hundreds of unique SKUs. For the purposes of this disclosure, the SKU or item data 18 may be referred to as SKU data but it not intended to limit the invention to the use of a SKU. Similarly, in example embodiments, as would be appreciated by one of skill in the art, the input device 16 may be any input device configured to receive, read, and/or scan data and is not intended to be limited to a barcode scanner. For example, the input device 16 may be configured to receive an input from a keyboard, mouse, or read Radio Frequency Identification (RFID) tags, smartcard chips, etc.

In operation, the computing device 12 may use the SKU or item data 18 to build a database 14 for use with a customs review system 20. In example embodiments, the customs review system 20 may be used to collect, categorize, and otherwise transform detailed information (e.g., SKU or item data 18) about product parcels being shipped for customs pre-approval. In accordance with example embodiments, the SKU or item data 18 may be received from a customer, manufacturer, or reseller prior to acceptance of a shipment and stored in the database 14. In example embodiments, the computing device 12 may collect the SKU or item data 18 using input device 16 to receive and/or download SKUs on various product parcels to be shipped and store their respective SKU or item data 18 in the database 14. In example embodiments, the product parcels may include a barcode to be scanned (e.g., by input device 16) which includes one or more SKUs entered into the database 14. As would be appreciated by one of skill in the art, the product parcels being scanned may include items a shipper has received from a customer for shipment or may be products within a shipper's own inventory being prepared for shipment. In example embodiments, the SKU or item data 18 may be stored in the database 14 in a displayable and/or searchable format. The computing device 12 may search the database 14 for SKU or item data 18 associated with product parcels. For example, the computing device 12 may connect with the database 14 to search the database 14 for the SKU or item data scanned from a barcode on a particular parcel.

In accordance with an example embodiment of the present invention, the computing device 12 may obtain/receive information associated with the product parcels, including a Universal Resource Locator (URL) for a webpage from which the SKU or item included in the product parcels are advertised, marketed, and/or displayed. As would be appreciated by one of skill in the art, one or more URL(s) for the product parcels may be directly received from an input by a user (e.g., manual entry, download from a storage device, etc.) or uploaded directly by a data transfer from a customer, manufacturer, or reseller. For example, the SKU or item data 18 and the corresponding URLs may be provided directly to the computing device 12 by a customer, manufacturer, or reseller of the product parcels via an electronic interchange or other means. Once the SKU or item data 18 and the URL for each product parcel of a shipment have been received and/or obtained, the computing device 12 may associate the SKU or item data 18 with the appropriate URL in the database 14. In example embodiments, the database 14 may be updated to store all the SKU or item data 18 and their associated URL(s) for the product parcels being shipped. In further embodiments, the step of associating the SKU or item data 18 with a URL may be carried out by the computing device 12 which performs an automated search for the items associated with the SKU or item data 18, identifies the webpage from which the items are advertised or marketed, and records the URL of the webpage stored in the database 14. In example embodiments, the additional information may include a Harmonized Tariff Schedule of the United States (HTSUS) code to be associated with the SKU or item data 18.

In accordance with an example embodiment of the present invention, the computing device 12 uses the customs review system 20 to review the received and/or obtained SKU or item data 18 and their associated URL(s) for each product parcel to be shipped. When new SKU or item data 18 is received from customers, resellers, or manufactures, the SKU or item data 18 is automatically stored in the database 14 and flagged for review by a screener. For example, the new SKU or item data 18 may be emailed to a screener and the SKU or item data 18 and the associated URL(s) may be displayed to a screener by the customs review system 20 for pre-approval. As would be appreciated by one of skill in the art, the customs review system 20 may be displayed using an interface having a combination of hardware and software for processing, categorizing, and displaying the SKU or item data 18 stored in the database 14. For example, the customs review system 20 and SKU or item data 18 may be displayed on a computer monitor (e.g., liquid crystal display (LCD), cathode ray tube (CRT), etc.), on a display device of a mobile device (e.g., tablet, mobile phone, etc.), on another display device known in the art (e.g., projector, television, etc.), or a combination thereof. As would be appreciated by one of skill in the art, customs review system 20 may be used in conjunction with the computing device 12, the database 14, and/or the input device 16. In example embodiments, the customs review system 20 displays the information stored in the database 14 via a Graphical User Interface (GUI). The GUI enables a screener to manipulate the various views of the SKU or item data 18 and access different information about the SKU or item data 18, as discussed herein. As would be appreciated by one of skill in the art, the customs review system 20 may use other interfaces in place of or addition to a GUI for conveying the SKU or item data 18 and related information in the database 14 to the screener.

In accordance with an example embodiment of the present invention, the customs review system 20 may organize, categorize, and otherwise transform the SKU or item data 18 (e.g., and the associated URL(s)) for display in an easily reviewable format in which the SKUs or items may be marked valid or invalid by a screener. For example, the screener may view the most updated photos and descriptions for each SKU or item and the current webpage link for each of the SKUs or items for a shipment. A screener may review the photos and descriptions for each SKU or item for any potential violations for a particular customs authority or agency to determine legality of importation of that product parcel. For example, the screener may review photos for registered brands, designs, or trademarks. Based on the review of the screener, each SKU or item is marked as "valid" or "invalid". Similarly, the SKU or item data may be marked as under investigation when the screener is unsure if the SKU or item data is valid or invalid.

After the screener has reviewed the SKU or item data 18, parcel data for a shipment may be received from a customer. In accordance with an example embodiment of the present invention, the customs review system 20 may use the SKU or item data 18 in the database 14 to automatically approve or reject product parcels based on the validity of the SKU or item data 18 associated with the product parcels. For example, upon reception of the parcel product data indicating the SKUs included in the product parcels for a shipment, the SKU or item data 18 is searched to automatically categorize each product parcel as being pre-approved or rejected. Specifically, the product parcels may be automatically marked as accepted or rejected based on whether the SKUs or items (e.g., the SKU or item data 18) included in the product parcels were marked "valid" or "invalid" by the screener. As would be appreciated by one of skill in the art, the product parcels may be reviewed prior to receiving the product parcels at the shipper, after the product parcels are received by the shipper, or a combination thereof. In accordance with an example embodiment of the present invention, when one of the SKUs or items included the product parcels is not located in the database 14, the customs review system 20 may automatically reject the product parcels. For example, upon receiving the product parcel data, the customs review system 20 automatically initiates a step of searching for the included SKUs or items in the database 14 and if the SKUs or items are not found or are marked as invalid, the product parcel will be automatically rejected. Similarly, in example embodiments, storage of the included SKUs or items in association with a URL is an indication of pre-approval of the product parcels by the customs review system 20. For example, if the SKUs or items of a product parcel are searched in the database 14 and matches the SKU or item data 18 with an associated URL, then the product parcel is automatically approved.

Continuing with FIG. 1, the computing system 10 may also include a computing device 22 having a customs approval system 24 and an input device 26. As would be appreciated by one of skill in the art, computing device 22 may comprise any combination of computing devices as known in the art and operable to implement the present invention (e.g., as discussed with respect to computing device 12). Similarly, in accordance with an example embodiment of the present invention, the computing device 22 may include software for processing cargo or parcels received at customs (e.g., customs approval system 24). For example, the United States Customs agency utilizes an Automated Manifest System (AMS) for processing cargo or parcels. The customs approval system 24 may be designed to facilitate cargo arrival and release information for shipments destined to or transiting from a customs agency. In example embodiments, product parcels information in the database 14 may be transmitted to the customs approval system 24 prior to the shipment leaving the country of origin. For example, the computing device 12 may transmit the pre-approved SKU or item data 18 for a shipment from the database 14 to the computing device 22 for use by the customs approval system 24. The SKU or item data 18 may be transmitted to customs approval system 24 for review by customs to facilitate faster and efficient electronic customs clearance. In accordance with an example embodiment of the present invention, the input device 26 (e.g., the input device 16) may be configured to read and/or analyze SKU data (as discussed with respect to input device 16) into the customs approval system 24.

In operation, the customs approval system 24 may be used in conjunction with or in place of a customs agency's existing review/approval system. In accordance with an example embodiment of the present invention, the computing devices 12, 22 may be configured to establish a connection and communicate over telecommunication network(s) 28. As would be appreciated by one of skill in the art, the telecommunication network(s) 28 may include any combination of known networks. For example, the telecommunication network(s) 28 may be combination of a mobile network, WAN, LAN, or other type of network. The telecommunication network(s) 28 may be used to exchange data between the computing device 12 and the computing device 22, exchange data with the database 14 (e.g., in a cloud environment), and/or to collect data from additional sources. For example, the computing devices 12, 22 may connect with the webpage hosts 30 hosting the URL(s) associated with the SKU or item data 18 to obtain additional information from webpages associated with product parcels. In accordance with an example embodiment of the present invention, the computing devices 12, 22 may use the webpage host 30 to provide additional information to verify product parcels details. For example, the computing devices 12, 22 may index data from the URLs into the database 14 by crawling through the webpages and storing the indexed information (e.g., images, prices, descriptions) into the database 14. Accordingly, the information obtained from the webpage host 30 may be used to validate a particular price of the product parcels and/or download images of the product parcels for visual comparison.

Figure 2:
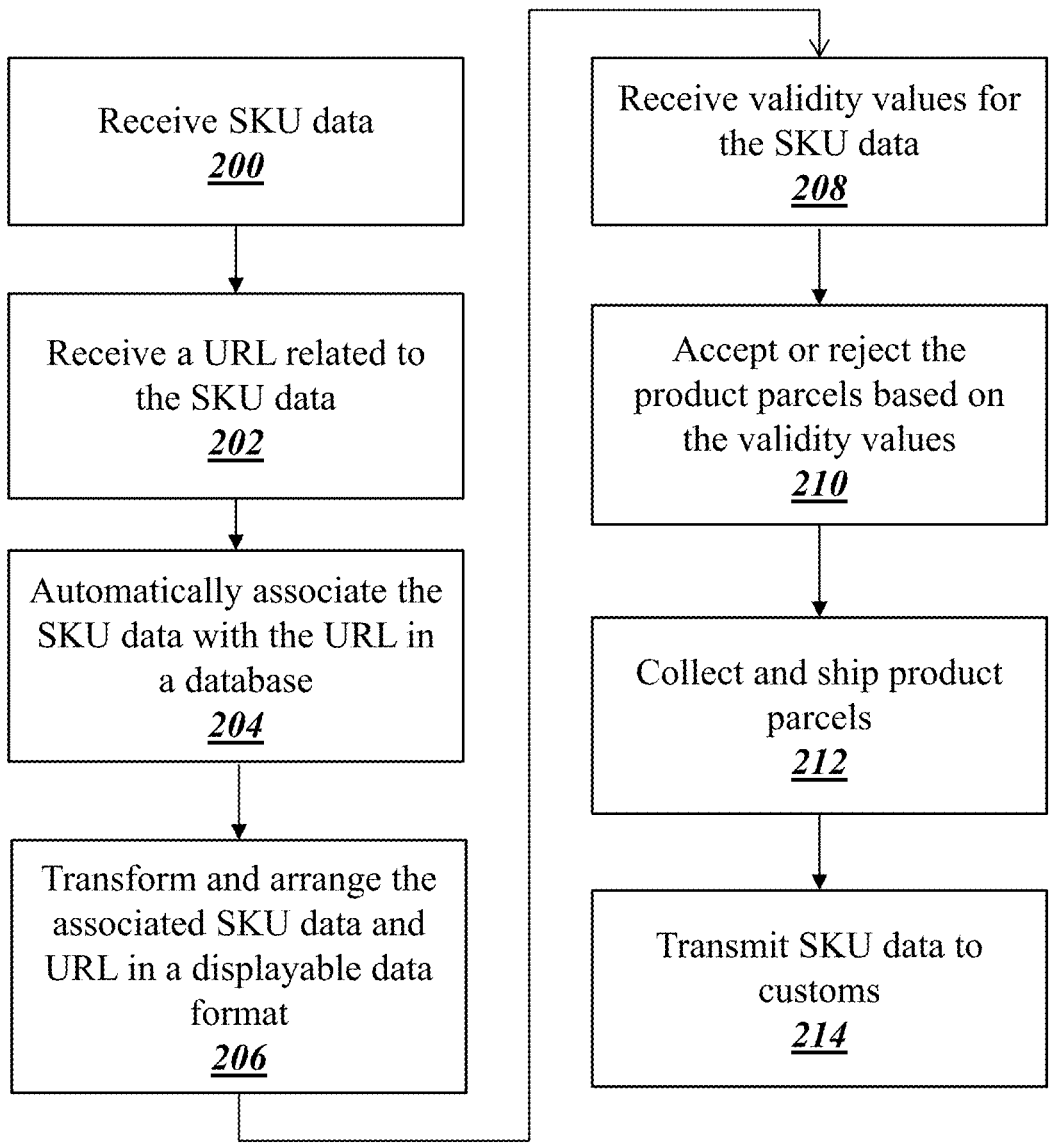
FIG. 2 is an illustrative flowchart depicting the building of a customs review system database, in accordance with aspects of the invention.
Figure 3:
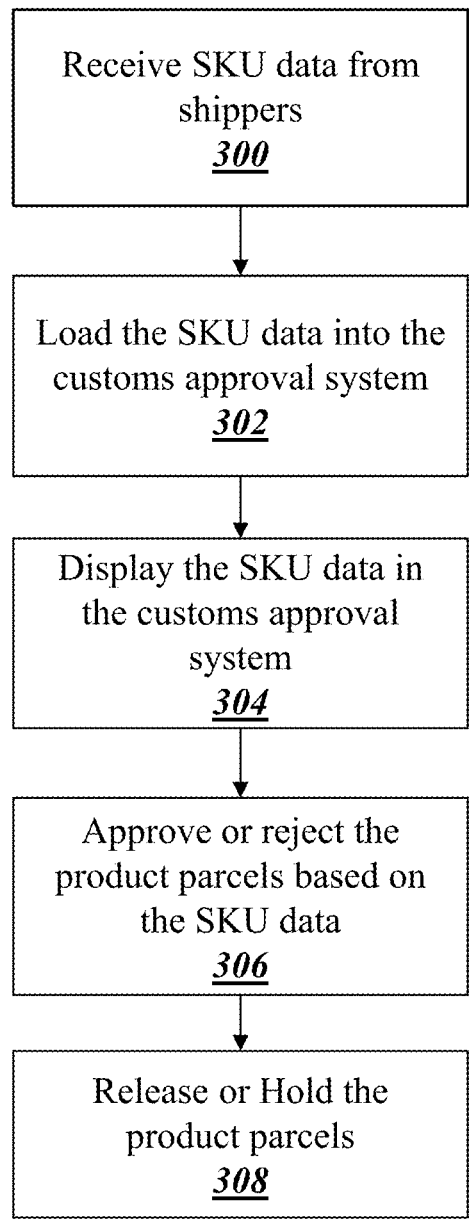
FIG. 3 is an illustrative flowchart depicting operation of a customs approval system, in accordance with aspects of the invention.

FIGS. 2 and 3 show exemplary flow charts depicting implementation of the present invention. Specifically, FIG. 2 depicts an exemplary flow chart showing the operation of a computing device 12 and a customs review system 20, as discussed with respect to FIG. 1. In particular, FIG. 2 depicts building the SKU or item database 14 and subsequently accepting or rejecting a parcel product based on the SKU or item data stored in the database 14. At step 200, SKU data (e.g., SKU or item data 18), for product parcels to be shipped, is received or otherwise obtained by the computing device 12. For example, the SKUs of the product parcels, or items within the product parcels, may be received directly from a customer, manufacturer, or reseller (e.g., through a data upload or interface using input device 16 as discussed with respect to FIG. 1). At step 202, one or more URLs are received or otherwise obtained that correspond to the received SKUs. For example, the URLs are received from the customer, manufacturer, or reseller of the product parcels being shipped. At step 204, the one or more URLs are automatically associated with the appropriate SKUs, by the computing device 12, in the database 14. In accordance with an example embodiment of the present invention, the one or more URLs may be used to collect additional information related to the SKUs. For example, the webpages corresponding to the one or more URLs may be accessed and indexed to obtain additional information related to the SKUs (e.g., images, descriptions, price, etc.). Thereafter, the computing system 12 may transform the data in the database 14 into a displayable format. For example, the SKUs and their associated URLs are displayed in a GUI with a tabular format having multiple rows and columns populated with the SKUs, URLs, and related collected data.

Continuing with FIG. 2, at step 208, the computing device 12 may receive validity values for the SKUs of the product parcels. In accordance with an example embodiment of the present invention, the received validity values may result from a screener reviewing the SKUs in the customs review system 20 marking product parcels as invalid or valid based on the consistency of the data to the physical product parcels or other criteria, as discussed with respect to FIG. 1. For example, the screener may have previously determined that a visual inspection of the image of a SKU or time included in the product parcel as depicted in the database 14 is a violation of the controlling copyright law.

At step 210, SKUs for product parcels to be shipped are received and the parcel products are automatically accepted or rejected based on the validity values. For example, a product parcel including an item with a SKU marked as invalid will be rejected for shipment. In accordance with an example embodiment of the present invention, the validity of the product parcels may be automatically determined by the computing device 12. For example, the received SKUs are searched in the database 14 and SKUs found in the database 14 are accepted, while SKUs not found or marked invalid are rejected. Additionally, the validity may be automatically accepted or rejected based on an automated comparison of values in the database 14 by the customs review system 20. For example, the customs review system 20 may compare the declared value of the SKU with the price of the SKU on the associated URL and if the comparison of the values exceeds a predetermined threshold/percentage, the SKU may be automatically rejected.

At step 212, the approved product parcels are collected, prepared for shipment, and shipped to the appropriate destination. In accordance with an example embodiment of the present invention, the determinations of which parcel products are accepted and rejected (e.g., from step 210) are returned to the customer, manufacturer, or reseller such that the shipper will only receive the accepted product parcels from the customer, manufacturer, or reseller. As would be appreciated by one of skill in the art, the accepted and rejected product parcels may be communicated to the customer, manufacturer or reseller using an Application Program Interface (API) or through a web browser interface. Accordingly, product parcels are accepted or rejected prior to receiving the actual product parcels from a customer, manufacturer, or reseller. For example, product parcels that are automatically rejected will never be received at the shipper facility. As would be appreciated by one of skill in the art, the product parcels may be reviewed prior to receiving the product parcels at the shipper, after the product parcels are received by the shipper, or both. In accordance with an example embodiment of the present invention, once the parcel products are physically received from the customer, manufacturer, or reseller, the barcodes on the product parcels may be scanned to obtain the SKU or item data 18 associated with the product parcels. If the product parcels were previously accepted, then a shipping label is printed and the product parcel may be processed for shipment. Alternatively, if the product parcel was previously rejected or if there is no data available related to that product parcel, then no shipment label is printed and the product parcel will not be processed for shipment. Rejected or unidentified product parcels may be subsequently returned to the customer, manufacturer, or reseller.

At step 214, the computing device 12 may transmit the SKU data, URL(s), and related information, for the product parcels accepted for shipment, to a customs approval system 24 at the appropriate customs agency for the desired destination of the shipment. In example embodiments, all the relevant SKU or item data 18 for the product parcels shipment are collected from the database 14, formatted, and transmitted to the appropriate customs approval system 24 of the receiving customs agency. For example, the SKU or item data 18 for the product parcels being shipped to the United States will be transmitted to the AMS at the United States Customs agency. As would be appreciated by one of skill in the art, the SKU or item data 18 may be transmitted prior to the shipment, scheduled such that the SKU or item data 18 will arrive at customs prior to the shipment, or include as a file containing the SKU or item data 18 with the shipment.

FIG. 3 depicts an exemplary flow chart showing the operation of the customs approval system 24 in accordance with aspects of the present invention. Specifically, FIG. 3 depicts an exemplary flow for the operation of a computing device 22 and a customs approval system 24 as discussed with respect to FIGS. 1 and 2. At step 300, the SKU or item data 18 for a particular package containing one or more SKUs is received from the shippers' computing device 12 at the customs approval system 24. For example, as discussed with respect to FIGS. 1 and 2, the computing device 22 at customs may receive SKU or item data 18, including the SKU(s), associated URL(s), and related information pertaining to items included in the product parcels received at customs. At step 302, the received SKU or item data 18 is loaded and/or accessed by the customs approval system 24 on the customs' computing device 22. For example, the customs approval system 24 loads the SKU or item data 18 into storage on the computing device 22 and transforms the SKU or item data 18 to a displayable format. As would be appreciated by one of skill in the art, a customs agent may be able to search for a specific product parcel (e.g., using a HAWB number) and review the SKU or item 18 associated with the searched product parcel. At step 304, the customs approval system 24 provides the SKU or item 18 data for display to a customs agent for review. For example, the customs approval system 24 displays the SKU or item data 18 such that a customs agent can review photos, prices, and/or descriptions of the product parcels. As would be appreciated by one of skill in the art, the customs approval system may display the data in a tabular format, such as the GIU discussed with respect to FIGS. 1 and 2.

Continuing with FIG. 3, at step 306, the product parcels are approved or rejected based on the displayed SKU or item data 18. For example, the customs agent may review the SKU or item data 18 provided by the database 14 to determine whether the product parcels are suitable to be accepted through customs. Specifically, based on the review the customs agency may determine whether the SKUs associated with the product parcels meet the rules and regulations for that customs agency and subsequently mark the product parcel accepted or rejected appropriately. For example, the customs agent/agency may use the customs approval system 24 to compare a declared value of the product parcels with the price of the product parcels indicated by the SKU or item data 18 (e.g., total price collected from the associated URL). From such a comparison, the customs agent/agency may be able to validate/invalidate the product parcels declared value. At step 308, based on whether the product parcel is accepted or rejected (e.g., validated or invalidated), the product parcel may be released from customs or put on hold for further evaluation. In accordance with an example embodiment of the present invention, the customs processing status of the product parcels may be updated and transmitted back to the shippers' computing device 12. Accordingly, the customs review system 20 on the shippers' computing device 12 may be able to receive the status information and update the status (e.g., status 418 as discussed with respect to FIG. 4 below) for that product parcel.

FIG. 4 depicts a representative view of a customs review system (e.g., customs review system 20 as discussed with respect to FIGS. 1 and 2) as displayed to a shipper. Specifically, FIG. 4 depicts a representative view of the customs review system displaying SKU data (e.g., SKU or item data 18 and URL information) from a database (e.g., database 14) created from SKU data (e.g., SKU or item data 18) received from customers, manufacturers, or resellers. For example, SKUs for product parcels to be shipped or all the SKUs included in numerous product parcels for a bulk shipment are collected and displayed in a customs review system 400 for analysis by a shippers' screener. In accordance with an example embodiment of the present invention, the customs review system may include columns for name 402, sellers 404, images 406, company 408, SKU 410, price 412, country (e.g., country of manufacture) 414, short name 416, status 418, and assigned user 420. As would be appreciated by one of skill in the art, the columns in the customs review system 400 may include a display of any combination of additional information.

In operation, a particular user may be assigned to screen the SKUs for the product parcels prior to shipment, as reflected in column for the assigned user 420 of customs review system 400. For example, "Nataliya Kulpinova" may be the assigned user 420 responsible for reviewing the SKU data as shown in FIG. 4. The screener (e.g., assigned user 420) may use the customs review system 400 to review SKU data for consistency and validate or invalidate SKUs based on the displayed information. In example embodiments, the screener is able to review a SKU's, name 402, seller 404, images 406, manufacturer/reseller company 408, SKU 410, price 412, country of manufacture 414, and short name of the product 416 as part of their determination process.

In accordance with an example embodiment of the present invention, the screener is able to obtain additional information for particular SKUs by clicking data links in select columns of the customs review system 400. In example embodiments, data links may be included within the columns titled, sellers 404, images 406, and short name of the product 416 and may include additional information about the associated SKUs. For example, selecting a data link in the seller 404 column for a particular SKU may open a pop-up window containing the SKU's seller's name, URLs associated with particular SKU (e.g., the URL associated with the SKU or item data 18 as discussed with respect to FIGS. 1 and 2), and/or the price of the SKU. Accordingly, the screener may be able to click the URL in the pop-up window to visit the SKU's associated webpage for additional review information. As would be appreciated by one of skill in the art, the webpage may be loaded using a web browser implemented within the customs review system 400 or may be loaded in an external default web browser of the computing device. In accordance with an example embodiment of the present invention, a selection of a link in images 406 may result in images of the product parcel being displayed in a pop-up window for visual comparison by the screener. The images 406 may be populated via a webhost (e.g., webhost 28) of the webpage associated with the product parcels, as discussed with respect to FIGS. 1 and 2.

Continuing with FIG. 4 the screener may be able to select a data link in the status 418 column to update the validity status of SKU based on their review of the SKU data. In accordance with an example embodiment of the present invention, a screener may be able to update a status of a particular SKU by selecting a drop-down menu from the status 418 column and selecting "validate" or "invalidate". In accordance with an example embodiment of the present invention, the selection of "validate" or "invalidate" by the screener is performed prior to the product parcels containing the SKUs physically arriving at the shipping facility. Similarly, the selection of "validate" or "invalidate" by the screener may be used in the automatic determination of whether the shipper will accept or reject the product parcel to be shipped from their facility. For example, if an SKU in a product parcel is marked as invalid, then the product parcel is automatically rejected and never received at the shipper facility. In accordance with an example embodiment of the present invention, the status 418 column may also include status indicators as to the status of product parcels in customs. As would be appreciated by one of skill in the art, the product parcels status updates (e.g., parcel products that are on hold) may be received from customs and automatically uploaded or the status information may be manually entered by a user.

Figure 5A:
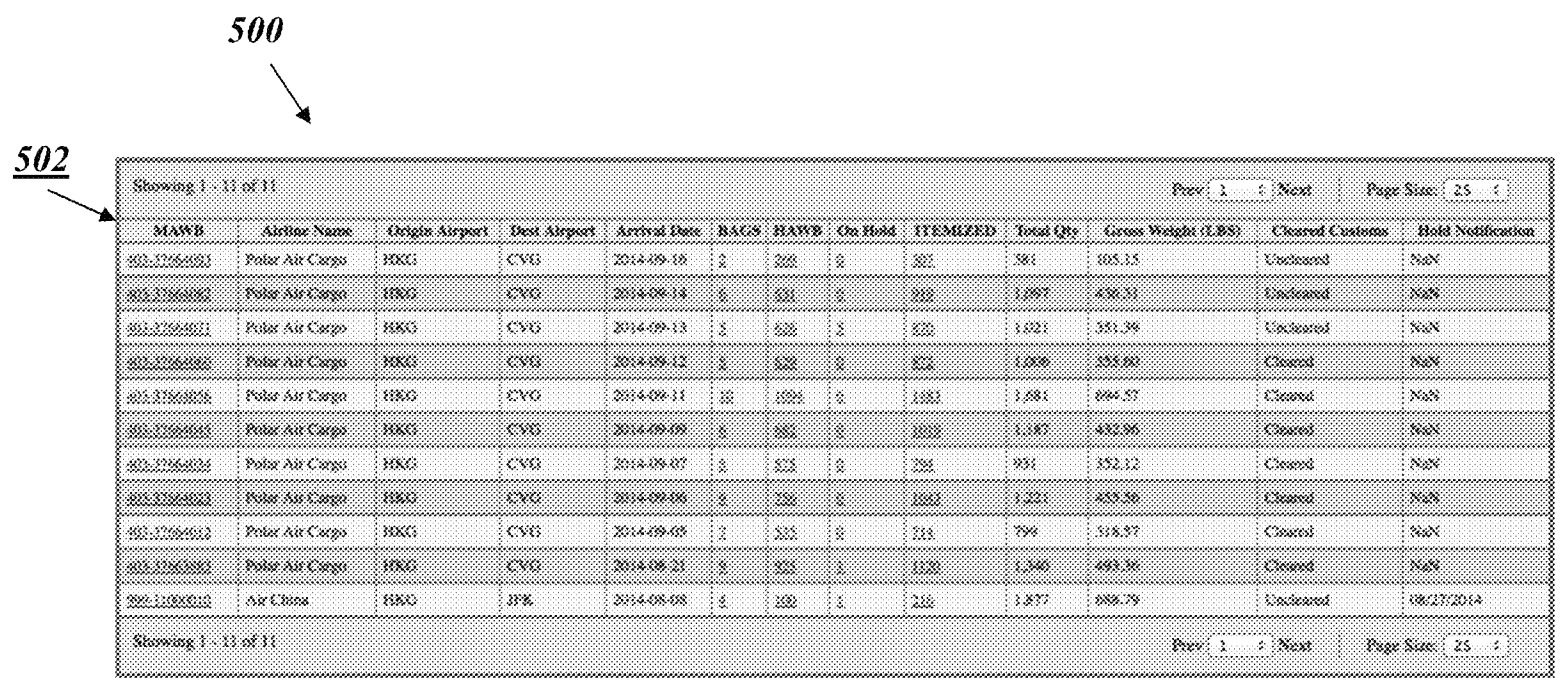
Figure 5B:
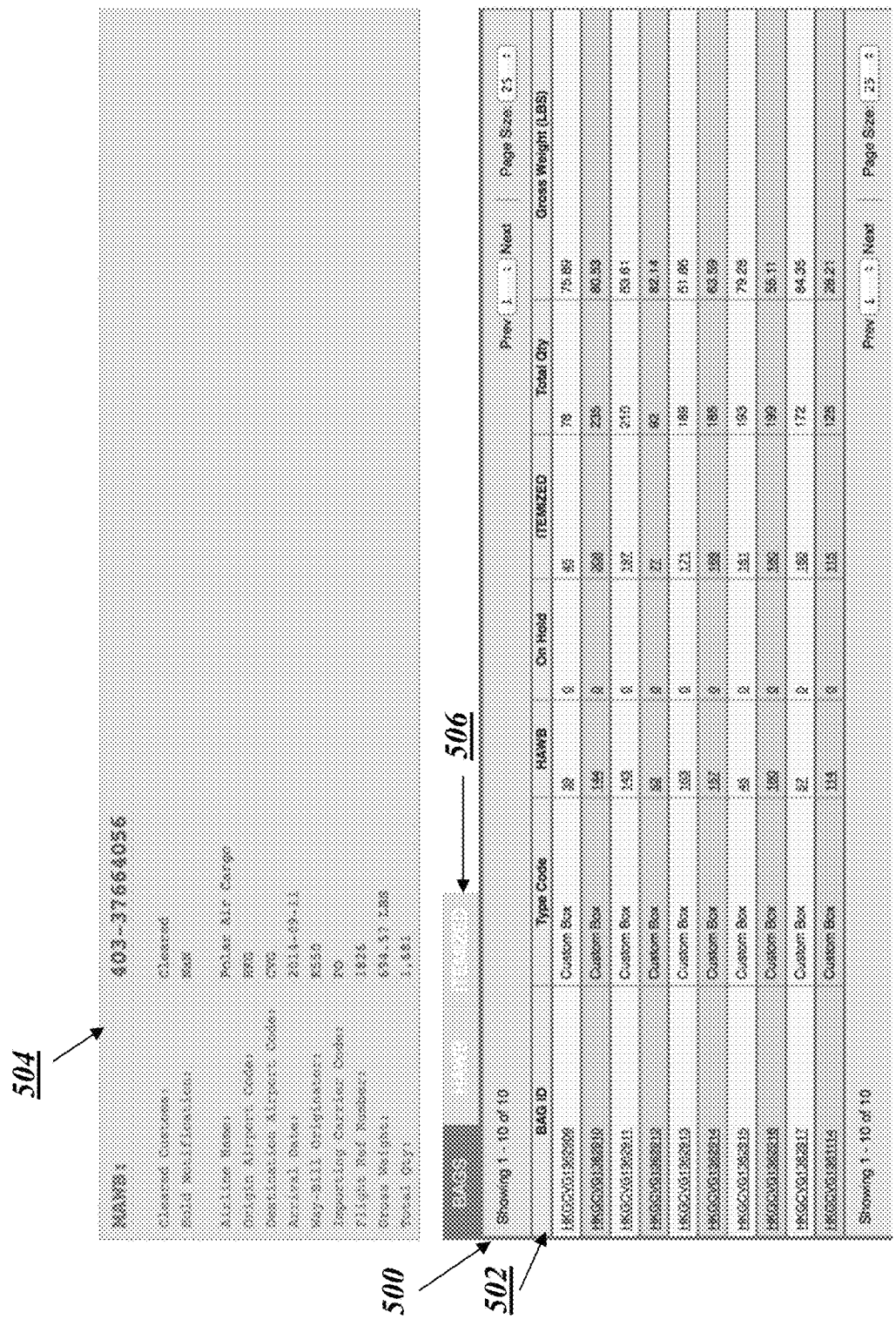

FIGS. 5A-5E depict representative views of tabular displays 500 for customs approval system (e.g., customs approval system 24) or electronic manifest system (e.g., AMS) as viewed by a customs agent/agency. For example, the tabular display 500 may be a GUI for displaying parcel data (e.g., parcel data 18) for product parcels received in customs, as discussed with respect to FIGS. 1 and 3. FIG. 5A depicts an initial tabular display 500 for the customs approval system. In accordance with an example embodiment of the present invention, the initial tabular display 500 may include columns 502 with headers for Master Air Waybill (MAWB), Airline Name, Origin/Destination Airports, Arrival Data, BAGS, House Air Waybill (HAWB) (e.g., parcel products), On Hold, Itemized, Total Quantity, Gross Weight, Cleared Customs, and/or Hold Notification. As would be appreciated by one of skill in the art, these columns 502 are not intended to be limiting and may include any such columns for commonly used data fields used by customs. The parcel data included under each column header may be parcel data populated from the database data (e.g., database 14) received from the customs review system (e.g., customs review system 20) shipper, may be parcel data input by the customs agency, or a combination thereof. In example embodiments, the customs agent/agency may select links to the parcel data in certain columns 502 to display additional information for the selected data link. For example, selecting the link for 403-37664056 under the MAWB column header may bring up additional information about product parcels included in that particular MAWB.

FIG. 5B depicts the tabular display 500 after selecting one of the data links in the MAWB column. Specifically, FIG. 5B depicts the tabular display when the MAWB link 403-37664056, shown in FIG. 5A, has been selected. In accordance with an example embodiment of the present invention, in response to the selection, the data and the columns 502 in the tabular display 500 are updated to show a next level of information for the product parcels shipment of MAWB 403-37664056. For example, as shown in FIG. 5B, the columns 502 may be updated to include information pertaining to BAG ID, Type Code, HAWB, On Hold, Itemized, Total Quantity, and Gross Weight. As would be appreciated by one of skill in the art, these columns 502 are not intended to be limiting and may include columns for commonly used data fields used by customs. In example embodiments, an additional display window 504 is opened to provide additional information about the particular data link that was selected (e.g., MAWB 403-37664056). In accordance with an example embodiment of the present invention, tabs 506 may be displayed to show a particular level of detail currently being displayed by the tabular display 500. For example, the current level of detail depicted in FIG. 5B is the BAGS tab 506. Similarly to the columns 502 shown in FIG. 5A, certain data links in columns 502 shown in FIG. 5B can be selected to provide an additional level of detailed information pertaining to the selected data links. For example, selecting the HKGCVG1362909 link from the BAG ID column may bring up additional information pertaining to that particular BAG.

Figure 5C:
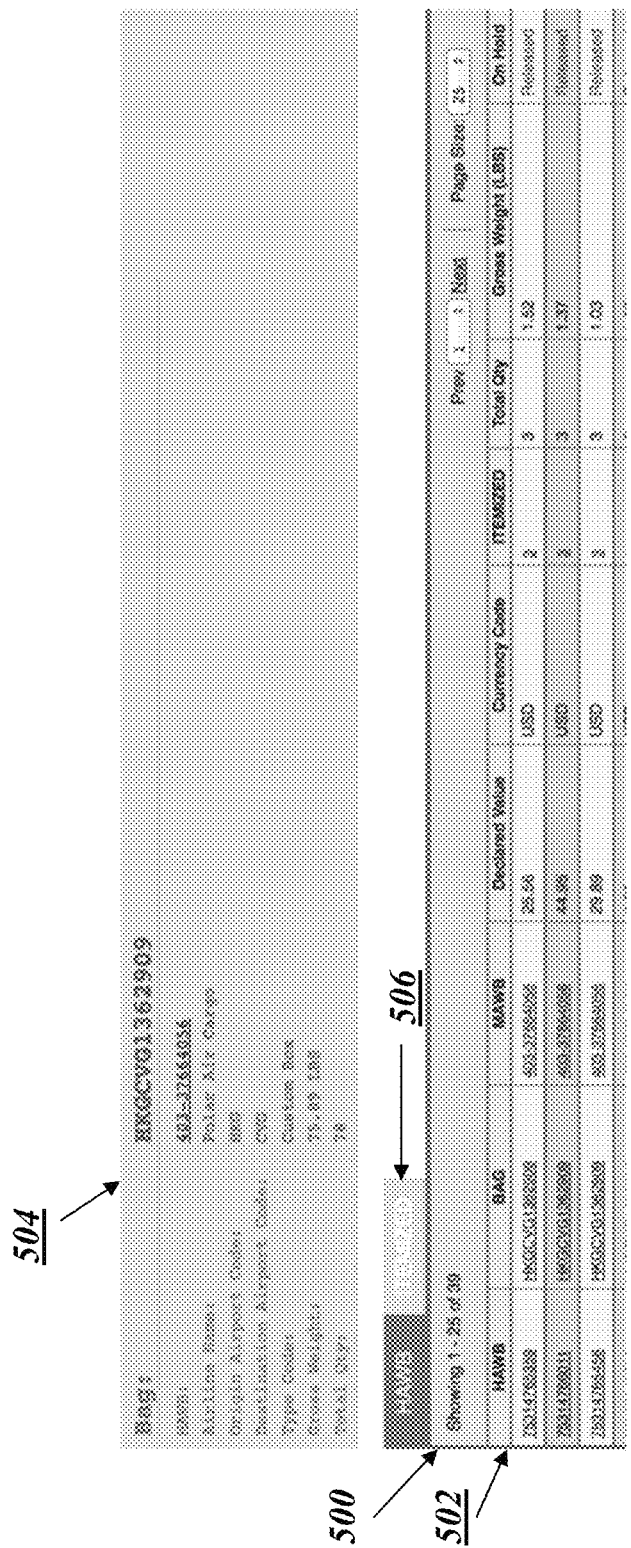

FIG. 5C depicts the tabular display 500 after selecting one of the data links in the BAG ID column. Specifically, FIG. 5C depicts the tabular display 500 when BAG ID data link HKGCVG1362909, shown in FIG. 5B, has been selected. In accordance with an example embodiment of the present invention, the parcel data and columns 502 in tabular display 500 are updated to show the next level of information for the product parcels shipment of BAG HKGCVG1362909. For example, as shown in FIG. 5C, the columns 502 may be updated to include information pertaining to HAWB, BAG, MAWB, Declared Value, Currency Code, Itemized, Total Quantity, Gross Weight, and On Hold. As would be appreciated by one of skill in the art, these columns are not intended to be limiting and may include columns for commonly used data fields used by customs. In accordance with an example embodiment of the present invention, the additional display window 504 is opened and/or updated to provide additional information about the particular data link that was selected with respect to FIG. B (e.g., BAG HKGCVG1362909). In further embodiments, tabs 506 may be updated to show the particular level of detail currently displayed by the tabular display 500. For example, the current level of detail depicted in FIG. 5C corresponds to the HAWB tag 506. In accordance with an example embodiment of the present invention, selecting one of the tabs 506 will update the tabular display 500 to include additional information. For example, selecting the ITEMIZED tab 506 may bring up additional information pertaining to the items contained in that particular bag.

Figure 5D:
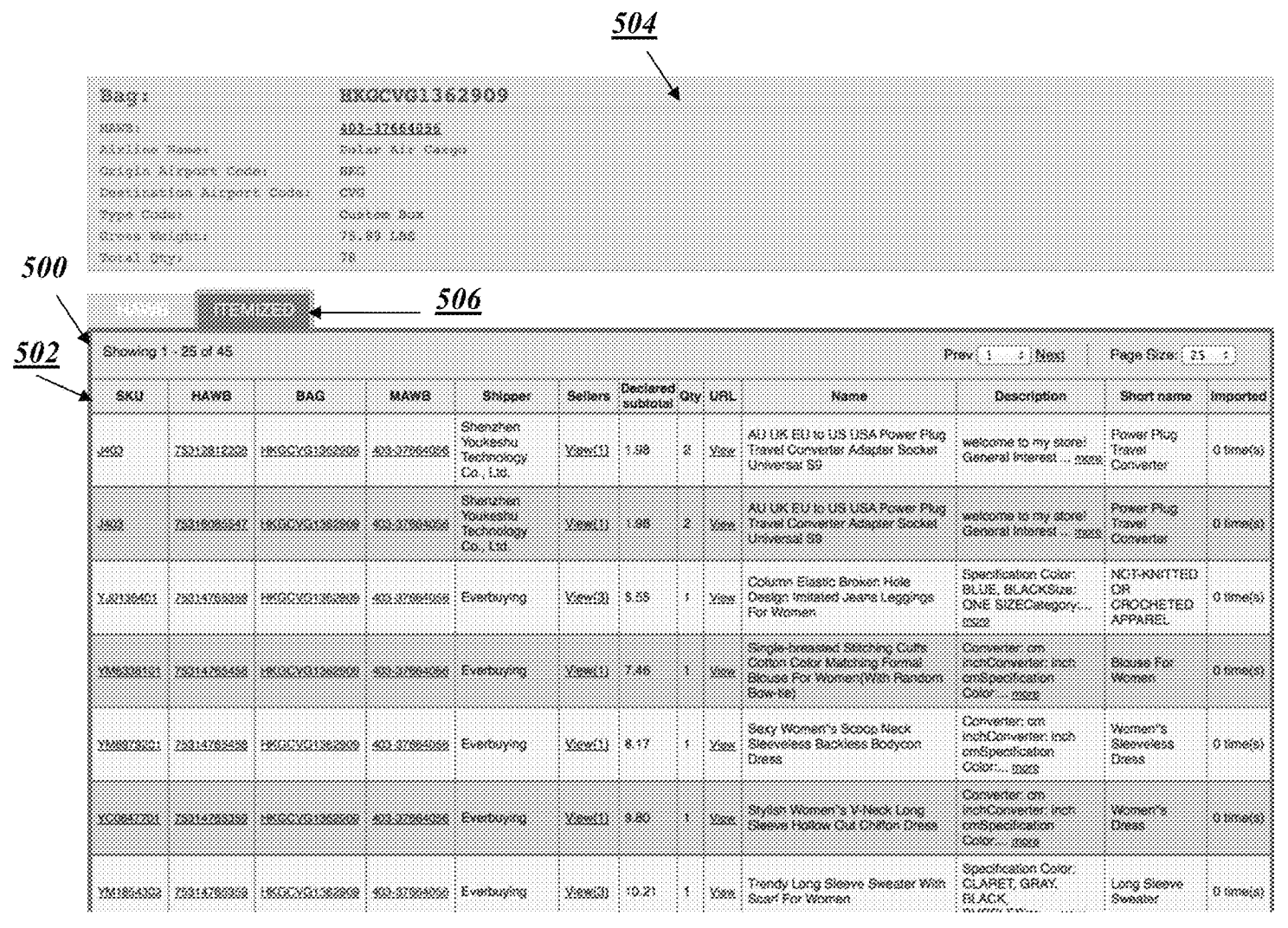

FIG. 5D depicts the tabular display 500 after selecting the ITEMIZED tab 506 from FIG. 5C. Specifically, selecting the ITEMIZED tab 506 will update the columns 502 and their respective parcel data entries pertaining to the items (e.g., SKUs) in the particular BAG (e.g., BAG HKGCVG1362909). In accordance with an example embodiment of the present invention, the parcel data and columns 502 in tabular display 500 are updated to show the next level of information for the product parcels shipment of Bag HKGCVG1362909. For example, as shown in FIG. 5D, the columns 502 may be updated to include information pertaining to SKU, HAWB, Bag, MAWB, Shipper, Sellers, Declared Subtotal Quantity, URL, Name, Description, Short Name, and Imported. As would be appreciated by one of skill in the art, these columns are not intended to be limiting and may include columns for commonly used data fields used by customs. In accordance with an example embodiment of the present invention, the additional display window 504 is opened and/or updated to provide additional information about the particular BAG (e.g., bag HKGCVG1362909). In accordance with an example embodiment of the present invention, the information included in the ITEMIZED tab 506 may include parcel data (e.g., parcel data 18 in database 14) received from the shippers, as discussed with respect to FIGS. 1 and 3. Similarly, to the columns 502 shown in FIG. 5A, certain data links in the columns 502 shown in FIG. 5D may be selected to provide an additional level of detailed information pertaining to the selected data links. For example, selecting the YM6338101 link from the SKU column may bring up additional information pertaining to that SKU.

FIG. 5E depicts the additional display window 504 after a particular SKU data link is selected from the SKU column 502, as shown in FIG. 5D. In accordance with an example embodiment of the present invention, the additional display window 504 is opened and/or updated from the previous tabular display 500 to provide additional information about the particular SKU (e.g., SKU YM6338101). For example, selecting the YM6338101 link from the SKU column may bring up additional information pertaining to that particular SKU. As depicted in FIG. 5E, the detailed information displayed in the additional display window 504 may include images 508, price, and description of the item. As would be appreciated by one of skill in the art, this detailed information is not intended to be limiting and may include additional SKU information commonly used by customs agencies. In accordance with an example embodiment of the present invention, the detailed information shown in the additional display window 504 may include the parcel data populated by the customs review system (e.g., customs review system 20) of the shipper. For example, images 508 of the SKU may be obtained from the associated URL, as discussed with respect to FIGS. 1-3 for display.

Figure 6:
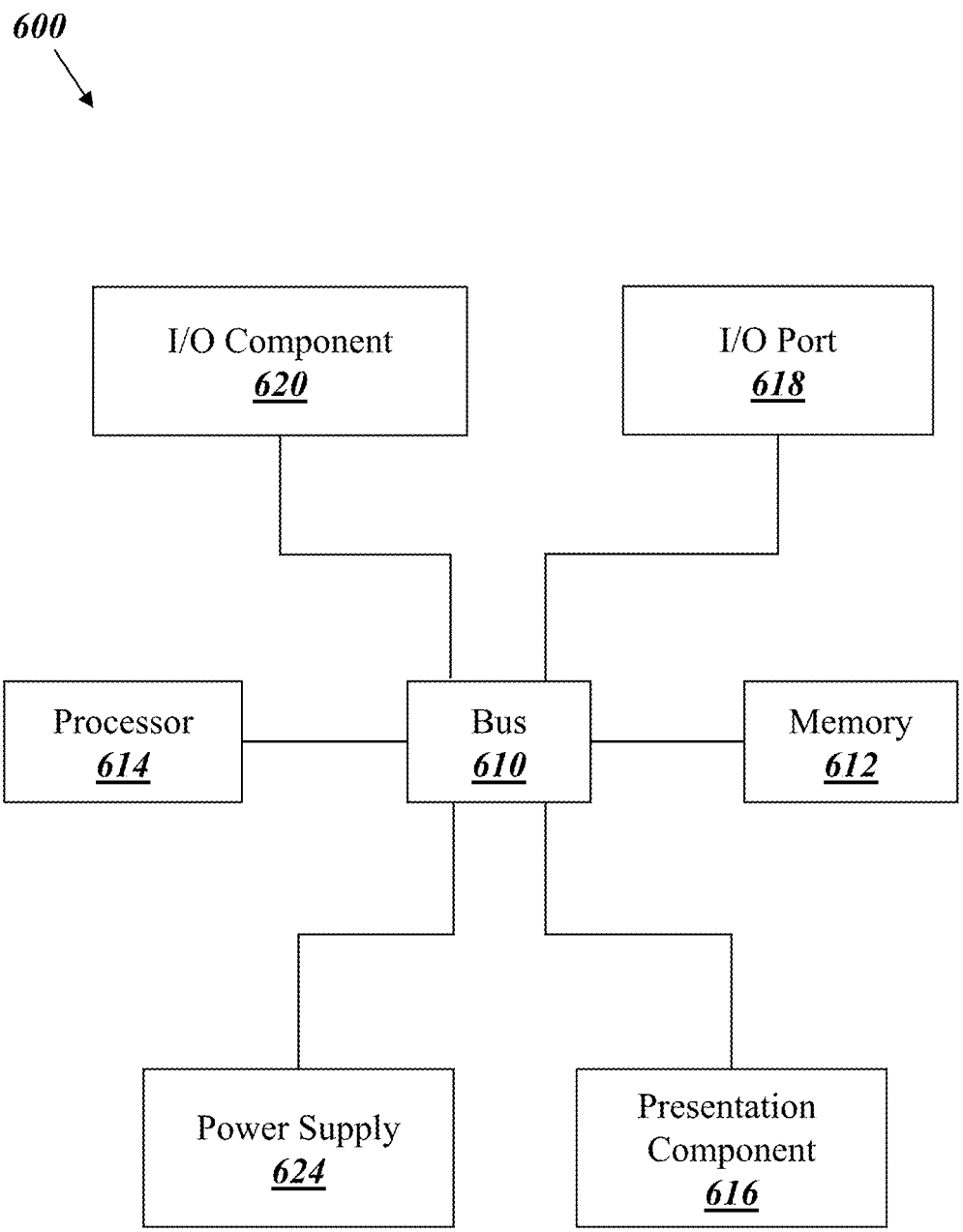
FIG. 6 is a diagrammatic illustration of a high level architecture for implementing processes in accordance with aspects of the invention.

Any suitable computing device can be used to implement the computing devices 12, 22 and methods/functionality described herein. One illustrative example of such a computing device 600 is depicted in FIG. 6. The computing device 600 is merely an illustrative example of a suitable computing environment and in no way limits the scope of the present invention. A "computing device," as represented by FIG. 6, can include a "workstation," a "server," a "laptop," a "desktop," a "hand-held device," a "mobile device," a "tablet computer," or other computing devices, as would be understood by those of skill in the art. Given that the computing device 600 is depicted for illustrative purposes, embodiments of the present invention may utilize any number of computing devices 600 in any number of different ways to implement a single embodiment of the present invention. Accordingly, embodiments of the present invention are not limited to a single computing device 600, as would be appreciated by one with skill in the art, nor are they limited to a single type of implementation or configuration of the example computing device 600.

The computing device 600 can include a bus 610 that can be coupled to one or more of the following illustrative components, directly or indirectly: a memory 612, one or more processors 614, one or more presentation components 616, input/output ports 618, input/output components 620, and a power supply 624. One of skill in the art will appreciate that the bus 610 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 6 is merely illustrative of an exemplary computing device that can be used to implement one or more embodiments of the present invention, and in no way limits the invention.

The computing device 600 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 600.

The memory 612 can include computer-storage media in the form of volatile and/or nonvolatile memory. The memory 612 may be removable, non-removable, or any combination thereof. Exemplary hardware devices are devices such as hard drives, solid-state memory, optical-disc drives, and the like. The computing device 600 can include one or more processors that read data from components such as the memory 612, the various I/O components 616, etc. Presentation component(s) 616 present data indications to a user or other device. Exemplary presentation components include a display device, speaker, printing component, vibrating component, etc.

The I/O ports 618 can enable the computing device 600 to be logically coupled to other devices, such as I/O components 620. Some of the I/O components 620 can be built into the computing device 600. Examples of such I/O components 620 include a microphone, joystick, recording device, game pad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about" and "approximately" are intended to cover variations that may existing in the upper and lower limits of the ranges of subjective or objective values, such as variations in properties, parameters, sizes, and dimensions. In one non-limiting example, the terms "about" and "approximately" mean at, or plus 10 percent or less, or minus 10 percent or less. In one non-limiting example, the terms "about" and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A method, performed by one or more processors, the method comprising:
   receiving stock keeping unit (SKU) data from one or more items of a physical product parcel designated as intended to be shipped, wherein the SKU data is received by a customs approval system;
   automatically searching for the SKU data for the one or more items in a database, wherein the customs approval system searches for the SKU data;

automatically associating the SKU data with a Uniform Resource Locator (URL) for a webpage when the SKU data for the one or more items is located in the database;

indexing the webpage, by crawling, from which the one or more items associated with the SKU data are advertised or marketed for additional information on the one or more items and storing the indexed data of the webpage in the database;

transforming, arranging, and displaying the SKU data and the URL, wherein customs approval system transforms, arranges, and displays the SKU data and the URL;

wherein one or more of the SKU data and the URL are provided by a manufacturer or reseller of the one or more items;

wherein the database stores SKU data in association with the URL for the one or more items of the physical product parcel being shipped; and wherein upon storage and review of the SKU data, the URL, and the additional information in the database, the SKU data associated with the one or more items is transformed into, an invalid SKU item or a SKU item under investigation, when the SKU data for the one or more items intended to be shipped is not located in the database, the one or more items are classified as invalid, or is under investigation in the database, the customs approval system automatically rejects the one or more items for shipment and the one or more items of the physical product parcel are not processed for shipment.

2. The method of claim 1, wherein the customs approval system receives the SKU data from a scanning device configured to read SKU data.

3. The method of claim 1, further comprising automatically initiating the step of searching for the SKU data for the one or more items of the physical product parcel in the database upon the customs approval system receiving the SKU data.

4. The method of claim 1, wherein the URL for a webpage is a webpage from which the one or more items of the physical product parcel is advertised or marketed.

5. The method of claim 1, wherein the webpage displays at least one image of the one or more items of the physical product parcel being shipped.

6. The method of claim 1, wherein the step of displaying data identifying the SKU data and data identifying the URL for the webpage from which the one or more items of the physical product parcel is advertised or marketed comprises displaying a name and an image of the one or more items.

7. The method of claim 1, further comprising:
transforming and arranging the SKU data and the URL in a displayable format; and
receiving a validity value for the one or more items.

8. The method of claim 1, wherein the physical product parcel is accepted for shipment when the one or more items are marked as having valid SKU items.

9. A system, comprising:
a database coupled with a storage device storing one or more stock keeping unit (SKU) data representing an SKU for one or more items of a physical product parcel in association with a Uniform Resource Locator (URL) for a webpage from which the one or more items is advertised or marketed;
wherein one or more of the SKU data and the URL are provided by a manufacturer or reseller of the one or more items;

a customs approval system, comprising at least one processor, that automatically associates the SKU data with the URL for the webpage when the SKU data for the one or more items is located in the database;

wherein the customs approval system indexes the webpage, by crawling, from which the one or more items associated with the SKU data are advertised or marketed for additional information and the one or more items;

wherein the indexed data of the webpage is stored in the database;

wherein the customs approval system transforms, arranges, and displays the SKU data and the URL;

wherein storage of the SKU data in association with image data of the one or more items is an indication of pre-approval of the one or more items of the physical product parcel by the customs approval system;

wherein the database stores SKU data in association with the URL for the one or more items of the physical product parcel being shipped; and wherein upon storage and review of the SKU data, the URL, and the additional information in the database, the SKU data associated with the one or more items is transformed into, an invalid SKU item or a SKU item under investigation, when the SKU data for the one or more items intended to be shipped is not located in the database, the one or more items are classified as invalid, or is under investigation in the database, the customs approval system automatically rejects the one or more items for shipment and the one or more items of the physical product parcel are not processed for shipment.

10. The system of claim 9, wherein the webpage displays at least one image of the one or more items of the physical product parcel being shipped.

11. The system of claim 9, wherein the customs approval system provides, for display, data identifying the SKU data and data identifying the URL for the webpage from which the one or more items of the physical product parcel is advertised or marketed, to a display device.

12. The system of claim 11, wherein the display device comprises a mobile device.

13. The system of claim 9, further comprising a combination scanning and displaying mobile device configured for communication with the database.

14. The system of claim 9, wherein the storage device exists in a cloud computing infrastructure.

15. A method, performed by one or more processors, the method comprising:
receiving stock keeping unit (SKU) data from one or more items of a physical product parcel designated as intended to be shipped, wherein the SKU data is received by a customs approval system;
automatically searching for the SKU data for the one or more items in a database, wherein the customs approval system searches for the SKU data;
indexing a webpage, by crawling, from which the one or more items associated with the SKU data are advertised or marketed for additional information on the one or more items and storing the indexed data of the webpage in the database;
wherein upon storage and review of the SKU data and the additional information in the database, the SKU data associated with the one or more items is transformed into, an invalid SKU item or a SKU item under investigation; and rejecting the one or more items and the parcel being withheld from shipping by the customs approval system when the SKU data for the one or more items is not located in the database, when the SKU data is classified as invalid, or when the SKU data is under investigation in the database;

wherein the database stores SKU data in association with the URL for the one or more items of the physical product parcel being shipped; and wherein upon storage and review of the SKU data, the URL, and the additional information in the database, the SKU data associated with the one or more items is transformed into, an invalid SKU item or a SKU item under investigation, when the SKU data for the one or more items intended to be shipped is not located in the database, the one or more items are classified as invalid, or is under investigation in the database, the customs approval system automatically rejects the one or more items for shipment and the one or more items of the physical product parcel are not processed for shipment.

16. The method of claim 15, wherein the physical product parcel is rejected for shipment when any of the one or more items is marked as having an invalid SKU item.

17. The method of claim 15, wherein the SKU data is provided by a manufacturer or reseller of the one or more items.

\* \* \* \* \*